June 26, 1962 — D. POST — 3,040,583
OPTICAL PRESSURE TRANSDUCER
Filed Dec. 10, 1959
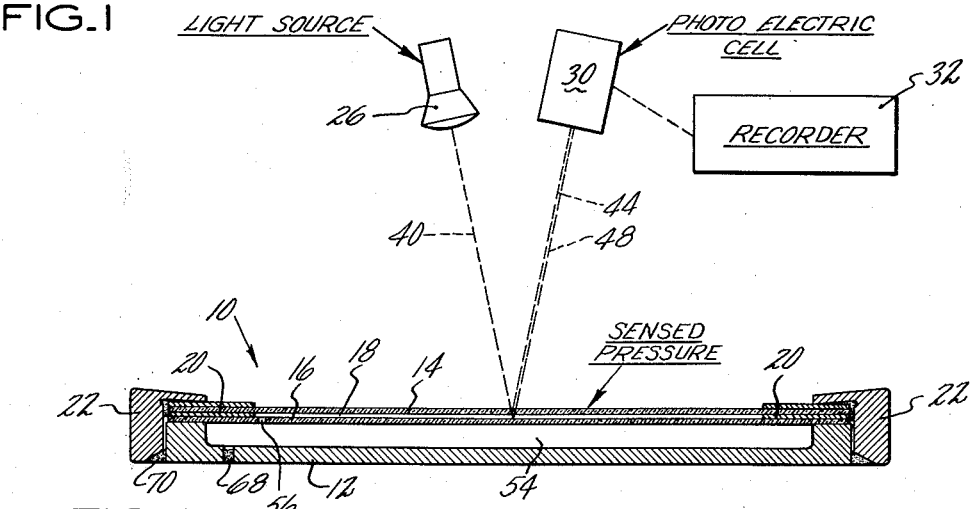
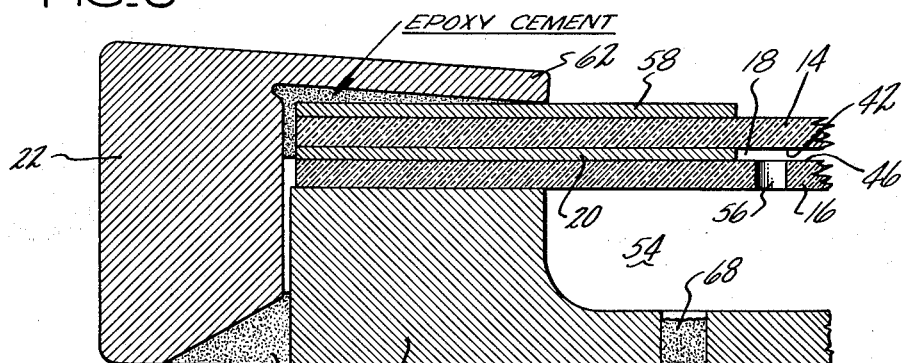
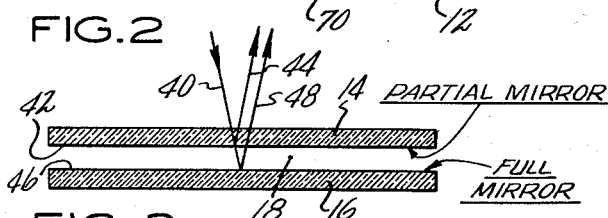
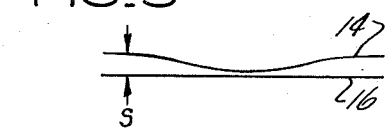
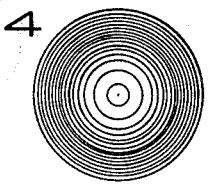
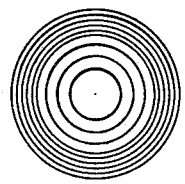
INVENTOR
DANIEL POST
BY Leonard F. Wiklund
ATTORNEY United States Patent Office 3,040,583
Patented June 26, 1962

3,040,583
OPTICAL PRESSURE TRANSDUCER
Daniel Post, Bolton, Conn., assignor to United Aircraft Corporation, East Hartford, Conn., a corporation of Delaware
Filed Dec. 10, 1959, Ser. No. 858,781
5 Claims. (Cl. 73—408)

This invention relates to a pressure transducer and more particularly to a pressure transducer for sensing relatively small transient pressures.

It is an object of this invention to provide a pressure transducer device or system in the form of a miniature pressure sensing device which operates on an optical interference principle thereby eliminating all electrical or mechanical connections to the sensor or pickup device.

It is a further object of this invention to provide a simple and lightweight pressure sensor.

It is a further object of this invention to provide a pressure sensor that is highly insensitive to acceleration forces.

It is a further object of this invention to provide a method of manufacturing an optical pressure transducer.

These and other objects of this invention will become readily apparent from the following detailed description of the drawing in which:

FIG. 1 is a showing of the pressure transducer system partially in cross section and partially in schematic;

FIG. 2 is a schematic illustration of the impinging and reflected light waves of the pressure sensor;

FIG. 3 is a diagrammatic illustration of the operation of the sensor;

FIGS. 4 and 5 are illustrations of the arrays of optical interference rings produced by the sensor; and FIG. 6 is an enlarged detail of a portion of the sensor illustrating the construction thereof.

As seen in FIG. 1, a pressure transducer or sensor is generally indicated at 10 as comprising a base member 12 for supporting a pair of upper and lower diaphragms 14 and 16 which are spaced apart to form a space 18. The diaphragms 14 and 16 are separated by a suitable spacer 20 and are in turn fixedly clamped to the base 12 by cap 22. Light rays from a suitable source 26 are reflected from both the diaphragm members 14 and 16 so as to reflect an array or pattern of concentric rings whose characteristics can be visually noted or sensed by a photoelectric cell 30. The photoelectric cell may be of the type designated by the Radio Corporation of America as 1P21 or another suitable photoelectrical transducer. The readout of the photoelectric cell may be conducted to a suitable recorder 32 for reduction to any form of data. The photoelectric cell 30 may scan the diameter or radius of the transducer and produce impulses commensurate with the number of light or dark rings being transmitted in the reflected beam. These impulses can be suitably recorded by any well-known device.

The diaphragms 14 and 16 (FIG. 2) are made of a suitable normally transparent material such as glass and are suitably coated with reflective films so that the diaphragm 14 is semi-transparent while the lower diaphragm 16 is substantially a full mirror. With the space 18 between the diaphragms maintained at some predetermined pressure (preferably low) any changes in pressure acting on the top side of the diaphragm 14 will cause it to deflect downwardly with respect to its cooperating diaphragm 16. As a result, an impinging light ray 40 will be partially reflected by the semi-transparent surface 42 of the diaphragm 14 as a reflected beam 44. That portion of the light ray 40 that passes on through the diaphragm 14 is reflected by the surface 46 of the diaphragm 16 so that the reflected beam 48 is produced.

As a result, when there is an increase in external pressure on the top side of the diaphragm 14 it will deflect as shown in an exaggerated form in FIG. 3. As a result, an interference fringe pattern such as shown in FIGS. 4 and 5 is observed when the entire surface of the gage is viewed. Each dark circle (destructive interference) is the locus of points at which the distance S (FIG. 3) is a constant. S changes by ½ the length of a light wave in the interval between adjacent dark bands. Thus, the number of interference fringes appearing in the pattern is a function of external pressure. Therefore, it would be apparent that the pattern or array shown in FIG. 4 is one for a relatively higher pressure being sensed than the pattern displayed in FIG. 5.

In order to determine the sign as well as the magnitude of the external pressure change, the inner chamber or space 18 of the cell is partially evacuated. Then a pattern of interference fringes appears for ambient pressure and the fringe density increases for external pressures greater than ambient and decreases for external pressures less than ambient. Of course the upper diaphragm 14 is not permitted to pass through its zero deflection position since this would provide a fringe count which would be ambiguous. The internal pressure of the transducer, i.e., in space 18, should be slightly less than the lowest pressure to be measured. The full range of pressures which can be sensed by the transducer is determined by the thickness and/or stiffness of the diaphragms.

As best seen in FIG. 6, the base 12 forms a relatively large chamber 54 which is connected with the space 18 by a passage 56. The passage 56 forms a restriction between the space 18 and the chamber 54 and thus acts as a dashpot or restriction orifice to damp out or filter rapid changes in deflection of the upper diaphragm 14 relative to the diaphragm 16.

The pressure transducer or sensor is constructed in a novel manner which permits it to be maintained substantially small in size and weight. Thus, a transducer has been made 0.3 inches in diameter with a thickness of 0.027 inch and having an over-all weight of 0.00027 pound. The diaphragms 14 and 16 are made from commercial microscope cover glass approximately 0.003 inch thick. The outside diameters of the diaphragms and the vent hole 56 are formed by an ultrasonic grinding process. The material is cut away by the action of abrasive particles impacted on the part at ultrasonic frequencies. The mirror coatings 42 and 46, respectively, are applied by high vacuum deposition. The lower diaphragm is coated at 46 with an opaque aluminum film yielding approximately 90 percent reflectance, whereas the upper diaphragm is coated at 42 with a dielectric coating providing approximately 30 percent reflectance and 70 percent transmittance.

The spacers 58 and 20 (FIG. 6) are made of 0.001-inch thick ground steel shim stock by a photoetching process. The base 12 and the cap 22 are machined from magnetic stainless steel.

Before assembly, the parts are washed in suitable agents such as xylene and methyl alcohol. The assembly is afforded by use of a magnetic block arranged so that the work piece spans the poles of the magnet, thus holding the parts during fabrication. The cap 22 is placed face down on the magnetic block and a minute quantity of epoxy cement (room temperature cure) is spread over the inside lip 62 of the cap. The elements of the transducer are then placed in the cap in the proper order and the magnetic attraction of the base 12 draws all the components together. This also induces a small elastic deflection of the relatively thin lip 62 of the cap 22. Cement is introduced into the groove area 70 to bond the base 12 to the cap 22. The entire unit may be placed in a suitable atmosphere having a pressure which is to become the predetermined datum in the chamber 54 and space 18. In this atmosphere, suitable cement is used to block the vent 68.

When the entire device is removed from its magnetic assembly block, the elements are maintained substantially clamped firmly in place by the spring action of the deflected lip 62.

As a result of this invention a very accurate pressure sensing device has been provided in the form of a miniaturized pressure transducer. The transducer is inherently insensitive to inertia forces such as accelerations due to the fact that it is only sensitive to the relative motion of the two diaphragms 14 and 16. Any inertial forces which may act on the transducer will affect both diaphragms the same so that no relative motion is introduced in this manner.

Although one embodiment of this invention has been illustrated and described herein, it will be apparent that various changes may be made in the construction and arrangement of the various parts without departing from the scope of the novel concept.

I claim:

1. A pressure sensor adapted to receive a light beam and reflect said beam with characteristics commensurate with the pressure level being sensed, a pair of upper and lower reflective and transparent discs, means forming a space between said discs, a casing for supporting said discs at their periphery including a peripheral wall in fluid tight engagement with the peripheral edges of said discs, an end wall connected to said peripheral wall and spaced from said lower disc and forming a chamber, means for establishing a predetermined relatively low pressure in said chamber and passage means connecting said chamber with said space.

2. A pressure sensor adapted to receive a light beam and reflect said beam with characteristics commensurate with the pressure level being sensed, a pair of upper and lower reflective and at least partially transparent discs including an annular peripheral spacer therebetween forming a space between said discs, a casing for supporting said discs at their periphery including a peripheral wall in fluid tight engagement with the peripheral edges of said discs, an end wall for said casing spaced from said lower disc and forming a chamber, means for establishing a predetermined relatively low pressure in said chamber and passage means connecting said chamber with said space.

3. A pressure sensor adapted to receive a light beam and reflect said beam with characteristics commensurate with the pressure level being sensed, a pair of upper and lower diaphragms including an annular peripheral spacer therebetween forming a space between said diaphragms, at least one of said diaphragms being partially transparent and both said diaphragms being reflective, a casing for rigidly supporting said diaphragms at their periphery including a peripheral wall in fluid tight engagement with the peripheral edges of said diaphragms, an end wall for said casing spaced from said lower diaphragm and forming a chamber, means for establishing a predetermined relatively low pressure in said chamber and a passage connecting said chamber with said space.

4. A pressure sensor according to claim 3 wherein said passage is a restriction and the volume of said chamber is relatively larger than said space.

5. A pressure sensor according to claim 3 including a cap for engaging said casing, said cap having a lip extending inwardly from the side wall thereof and resiliently engaging said upper diaphragm.

References Cited in the file of this patent

UNITED STATES PATENTS

| | | |
|---|---|---|
| 874,517 | Lowry | Dec. 24, 1907 |
| 2,374,945 | Minter | May 1, 1945 |
| 2,591,666 | Barkas et al. | Apr. 8, 1952 |
| 2,647,070 | Litton | July 28, 1953 |
| 2,780,574 | Ott et al. | Feb. 5, 1957 |

OTHER REFERENCES

"Optics and Appearance Instrumentation," by Richard S. Hunter. "Instrumentation," vol. 7, No. 3, second quarter 1954, page 36. (Copy in 73-432 P.E. Division 36.)

"Dynamic Pressure Measurement by Optical Interference," by Willard E. Buck and Walter H. Barkas. The Review of Scientific Instruments, vol. 19 No. 10, October, 1948, pages 678-684. (Copy in 73-408 Division 36.)